US010145951B2

(12) United States Patent
Izzat et al.

(10) Patent No.: US 10,145,951 B2
(45) Date of Patent: Dec. 4, 2018

(54) OBJECT DETECTION USING RADAR AND VISION DEFINED IMAGE DETECTION ZONE

(71) Applicant: Aptiv Technologies Limited, St. Michael (BB)

(72) Inventors: Izzat H. Izzat, Oak Oark, CA (US); Rohith Mv, Sunnyvale, CA (US)

(73) Assignee: APTIV TECHNOLOGIES LIMITED (BB)

( * ) Notice: Subject to any disclaimer, the term of this patent is extended or adjusted under 35 U.S.C. 154(b) by 268 days.

(21) Appl. No.: 15/084,914

(22) Filed: Mar. 30, 2016

(65) Prior Publication Data

US 2017/0285161 A1 Oct. 5, 2017

(51) Int. Cl.
| G01S 13/86 | (2006.01) |
| G06K 9/00 | (2006.01) |
| G06T 7/521 | (2017.01) |
| G01S 13/42 | (2006.01) |
| G01S 7/41 | (2006.01) |
| G06K 9/32 | (2006.01) |
| G01S 13/93 | (2006.01) |
| G01S 13/72 | (2006.01) |
| G01S 17/93 | (2006.01) |

(Continued)

(52) U.S. Cl.
CPC ............... G01S 13/867 (2013.01); G01S 7/41 (2013.01); G01S 13/42 (2013.01); G01S 13/723 (2013.01); G01S 13/931 (2013.01); G01S 17/023 (2013.01); G01S 17/66 (2013.01); G01S 17/936 (2013.01); G06K 9/00805 (2013.01); G06K 9/3233 (2013.01); G06T 7/521 (2017.01); *G01S 2013/9367* (2013.01)

(58) Field of Classification Search
CPC .......... G01S 13/867; G01S 13/42; G01S 7/41; G01S 13/931; G01S 13/723; G01S 17/936; G01S 17/66; G01S 17/023; G01S 2013/9367; G06K 9/00805; G06K 9/3233; G06K 9/00201; G06K 9/00382; G06K 9/00375; G06T 7/521
See application file for complete search history.

(56) References Cited

U.S. PATENT DOCUMENTS

| 5,617,085 A | 4/1997 | Tsutsumi et al. |
| 6,792,147 B1 | 9/2004 | Saka et al. |
| 7,756,298 B2 | 7/2010 | Miyahara et al. |

(Continued)

FOREIGN PATENT DOCUMENTS

WO 2010/048611 A1 4/2010

*Primary Examiner* — Bernarr E Gregory
(74) *Attorney, Agent, or Firm* — Lawrence D. Hazelton

(57) ABSTRACT

An object-detection system includes a radar sensor, a camera, and a controller. The radar-sensor is suitable for mounting on a vehicle and is used to detect a radar-signal reflected by an object in a radar-field-of-view. The radar-signal is indicative of a range, range-rate, and a direction to the object relative to the vehicle. The camera is used to capture an image of a camera-field-of-view that overlaps the radar-field-of-view. The controller is in communication with the radar-sensor and the camera. The controller is configured to determine a range-map for the image based on the range and the direction of the radar detection, define a detection-zone in the image based on the range-map, and process only the detection-zone of the image to determine an identity of the object.

18 Claims, 5 Drawing Sheets

(51) Int. Cl.
*G01S 17/66* (2006.01)
*G01S 17/02* (2006.01)

(56) References Cited

U.S. PATENT DOCUMENTS

| | | | |
|---|---|---|---|
| 8,718,334 B2* | 5/2014 | Whillock | G06K 9/00382 |
| | | | 382/115 |
| 8,983,130 B2* | 3/2015 | Yasugi | G01S 13/867 |
| | | | 382/103 |
| 9,405,006 B2* | 8/2016 | Ouchi | G01S 13/867 |
| 9,798,002 B2* | 10/2017 | Baba | G01S 13/867 |
| 2003/0179084 A1* | 9/2003 | Skrbina | G01S 13/931 |
| | | | 340/435 |
| 2004/0012516 A1* | 1/2004 | Schiffmann | G01S 13/723 |
| | | | 342/70 |
| 2004/0178945 A1 | 9/2004 | Buchanan | |
| 2006/0125679 A1 | 6/2006 | Horibe | |
| 2007/0146195 A1* | 6/2007 | Wallenberg | G01S 13/867 |
| | | | 342/52 |
| 2008/0199050 A1 | 8/2008 | Koitabashi | |
| 2009/0135065 A1 | 5/2009 | Tsuchida et al. | |
| 2010/0310121 A1* | 12/2010 | Stanfill et al. | G06K 9/00201 |
| 2013/0335569 A1* | 12/2013 | Einecke | G01S 13/867 |
| | | | 348/148 |
| 2014/0035775 A1 | 2/2014 | Zeng et al. | |
| 2015/0003673 A1* | 1/2015 | Fletcher | G06K 9/00375 |
| | | | 382/103 |
| 2015/0054673 A1* | 2/2015 | Baba | G01S 13/867 |
| | | | 342/27 |

* cited by examiner

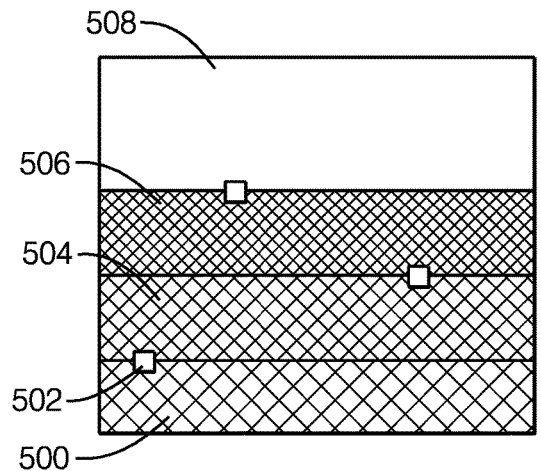
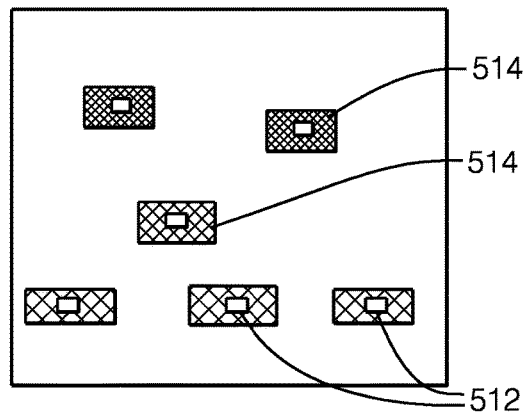
FIG. 5A    FIG. 5B
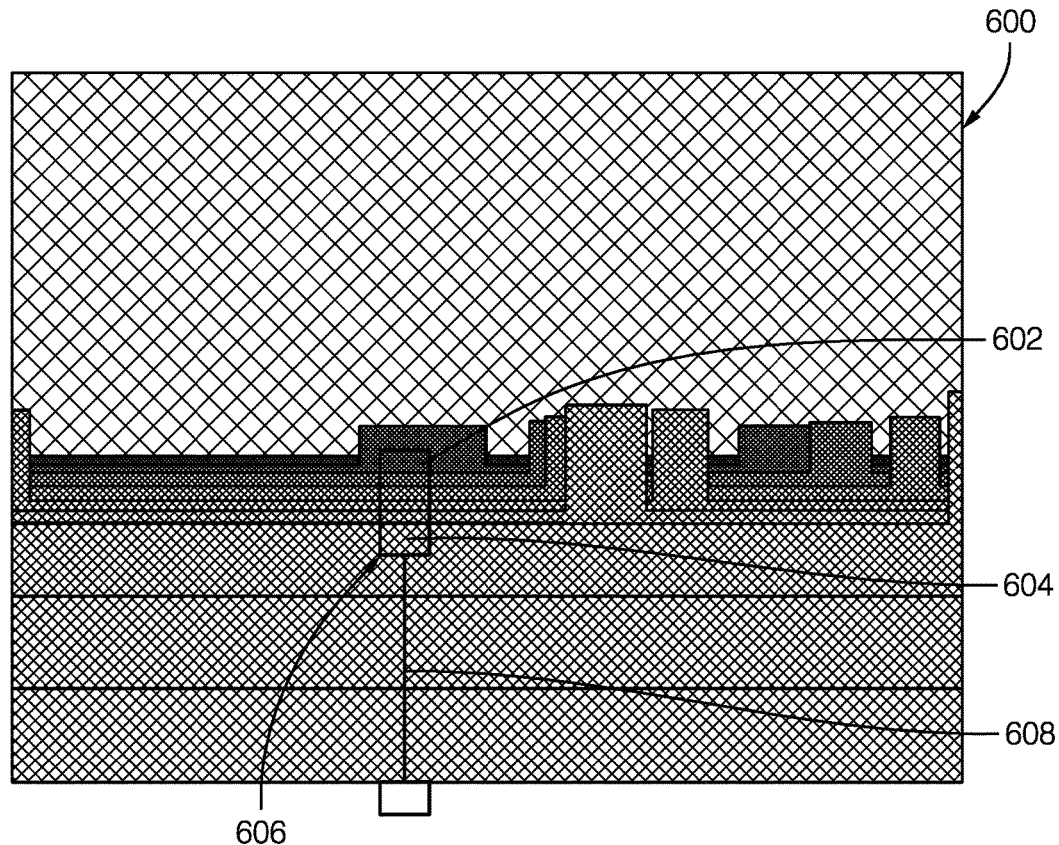
FIG. 6

OBJECT DETECTION USING RADAR AND VISION DEFINED IMAGE DETECTION ZONE

TECHNICAL FIELD OF INVENTION

This disclosure generally relates to an object-detection system, and more particularly relates to information from a radar sensor to define a detection-zone within an image from a camera that is processed to determine an identity of an object.

BACKGROUND OF INVENTION

Current Advanced Driver Assistance Systems (ADAS) and automated driving system use multiple sensors, such as camera, radar, and LiDAR, to detect objects in the proximity of the vehicle. The sensors use features such as intensity, range, color etc. to detect objects. Range value describing the distance to point in the scene is critical for the success and reliability of object detection. Range values can be combined to generate a 2-D range-map showing the distance to points in a scene from a specific point. Range-map normally associated with a sensor device such as camera or LiDAR. If the sensor is probably calibrated, range values can be given directly in feet or meters.

A single camera can be used to create generate range information using structure from motion. This typically results in sparse range estimation that may not be accurate especially for dynamic objects. Stereo camera or multiple camera setup system can also be used but add cost to the system in both hardware, since it uses multiple cameras and need to be probably calibrated, and in software since stereo range estimation is an expensive and error prone process. LiDAR has been the most widely used sensor for range estimation but is currently expensive for most applications, and limited in range it can measure.

SUMMARY OF THE INVENTION

Various embodiments describe herein include methods and systems for using Radar or LiDAR information to improve vision algorithms, where detections, range information, and range-rate are used as input to vision algorithms.

In accordance with one embodiment, an object-detection system configured to detect an object proximate to a vehicle is provided. The system includes a radar sensor, a camera, and a controller. The radar-sensor is suitable for mounting on a vehicle and is used to detect a radar-signal reflected by an object in a radar-field-of-view. The radar-signal is indicative of a range, range-rate, and a direction to the object relative to the vehicle. The camera is used to capture an image of a camera-field-of-view that overlaps the radar-field-of-view. The controller is in communication with the radar-sensor and the camera. The controller is configured to determine a range-map for the image based on the RDU range and the direction, define a detection-zone in the image based on the range-map, and process only the detection-zone of the image to determine an identity of the object.

In one exemplary embodiment of the present invention, a range-map is determined from RDU range information. The range-map can be used by vision algorithms to decide on the scale of search to use, on determining time-to-contact (TTC), for properly placing vision detection-zones on the ground among others.

In an alternative embodiment of the present invention, the speed of the object in the image is determined from RDU range-rate information. This help vision tracking by limiting the search space in the next frame. It can also be used to improve classification results of the vision algorithms. For example, a high speed object cannot be classified as a pedestrian.

In yet another embodiment of the present invention, an occupancy-grid and an interval-map are generated from the range-map. Vision system cannot provide, in general, good estimation of the range-map and hence the use of RDU range can help generate accurate occupancy-grid or interval-maps. In addition to generating static occupancy and interval-maps, RDU range-rate can be used to provide dynamic information.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 5A and 5B depict two examples of building range-map from RDU range information by the system of FIG. 1;

FIG. 6 depicts an example of constructing a range-map using RDU range information by the system of FIG. 1;

It should be understood that the drawings are for purposes of illustrating the concepts of the invention and are not necessarily the only possible configuration for illustrating the invention.

DETAILED DESCRIPTION

The present principles advantageously provide a method and system for improving vision detection, classification and tracking based on Range Detecting Unit (RDU). Although the present principles will be described primarily within the context of using Radar, the specific embodiments of the present invention should not be treated as limiting in the scope of the invention. For example, in an alternative embodiment of the present invention, a LiDAR unit may be used instead of Radar unit or a Light Emitting Diode (LED) based sensor may be used.

In ADAS and automated driving systems, sensors are used to detect, classify, and track obstacles around the host vehicle. Objects can be Vehicles, Pedestrian, or unknown class referred to as general objects. Typically two or more sensors are used to overcome the shortcoming of single sensor and to increase the reliability of object detection, classifications, and tracking. The outputs of the sensors are then combined to determine the list of objects in the scene.

Combining sensor information can be done at a high level where every sensor is processed independently with results combined at the end or at a low level where one sensor is used by another sensor at an early stage of processing. A combination of these methods is also possible. Without loss of generality, the system and method presented herein focuses on ADAS and Radar. In general, LiDAR provide more accurate and denser data and hence can result in better performance than Radar.

Figure 1:
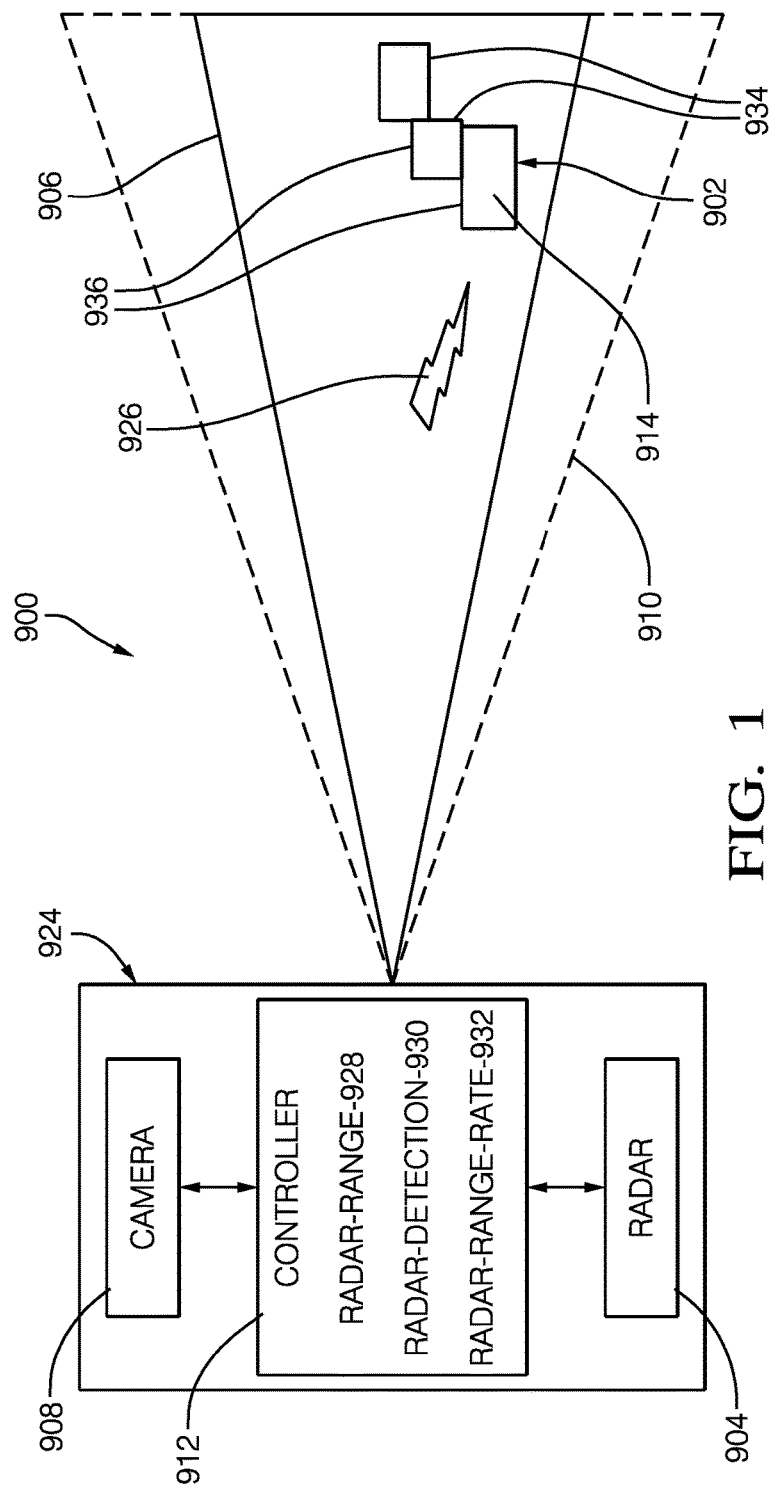
FIG. 1 depicts a block diagram of a system of for combining radar and vision sensors.

FIG. 1 illustrates a non-limiting example of an object-detection system 900 configured to detect an object 902 proximate to a vehicle 924. The object-detection system 900 includes a radar-sensor 904 that is used to detect a radar-signal 926 reflected by an object in a radar-field-of-view 906. The object-detection system 900 also includes a camera 908 used to capture an image 302 (FIG. 3A) of the object 902 in a camera-field-of-view 910 that overlaps the radar-field-of-view 906. The object-detection system 900 is generally configured to combine information from the radar-sensor 904 and the camera 908 in a manner that takes advantage of the strengths of these two devices and thereby compensating for the weaknesses of the radar-sensor 904 and the camera 908. One advantage of a camera based system is accurate detection and classification of an object. However, it is difficult for a camera only based system to estimate accurately the range and speed of the object. Radar or LiDAR can provide accurate range and range-rate and hence can enhance object detection system.

The controller 912 is further configured to use the RDU range 928 (the range 928), RDU direction (the direction 930), and an RDU range-rate 932 (the range-rate 932) to build a range-map 600 and use the range-map to adjust the size and location 606 of the detection-zone 602, to adjust the scale-factor 400 used for object search, to compute the TTC 608 to the detection-zone 602, to compute a static or dynamic instance of an occupancy-grid 800, and compute a static or dynamic instance of an interval-map 802. The controller 912 is also configured to use the RDU range-rate 932 to estimate the temporal movement path of the object for the purpose of reducing the search space during object tracking.

Figure 2:
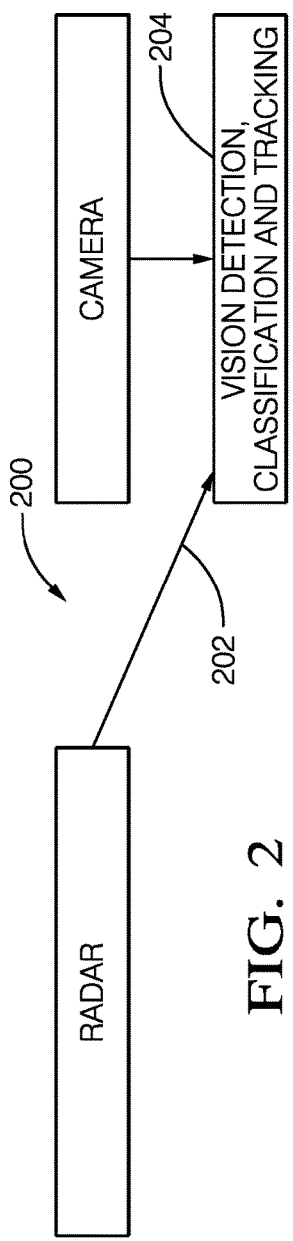
FIG. 2 depicts an object detection flow diagram of the system of FIG. 1.

FIG. 2 shows a non-limiting example of a signal flow diagram for combining Radar and vision. In the figure, Radar provides information 202 to the vision system 204 early in algorithm processing to allow it to detect, classify, and track objects effectively. The most useful information that Radar can provide in addition to RDUs are the RDU range and RDU range-rate. This information can benefit vision algorithms in a number of ways as will be described below.

Monocular vision system has been popular for ADAS applications due to its low cost and effectiveness in determining object class. To detect objects, a dataset of labeled image windows of fixed size (e.g. –n×m) are built. The database includes both positive and negative examples of the object to be detected (e.g. vehicle). A classifier is then trained to tell these windows apart. Every n×m window is then passed to the classifier for processing. Windows that the classifier labels positive contain the object, and those labeled negative do not. Object detection and classification can be done separately i.e. first detect then classify or detect/classify at the same. Detected objects are then tracked in the temporal domain using, for example, the centroid of the object window.

The search for objects in vision systems is typically done in sliding window fashion [Computer vision a Modern approach, by Forsyth and Ponce, Publisher: Pearson, $2^{nd}$ edition 2011] starting from the top left corner of the image to the lower right. Since not all instances of an object will be the same size in the image, search must be done over multiple scales. Typically three or more scales are used depending on processing power available. We will use scale-factor 400 to represent the number of scales used in the search. The sliding window detection is well behaved in practice with different applications requiring different choices of feature. However the processing requirements are very high which limits the types and number of objects that can be searched.

Figure 3:
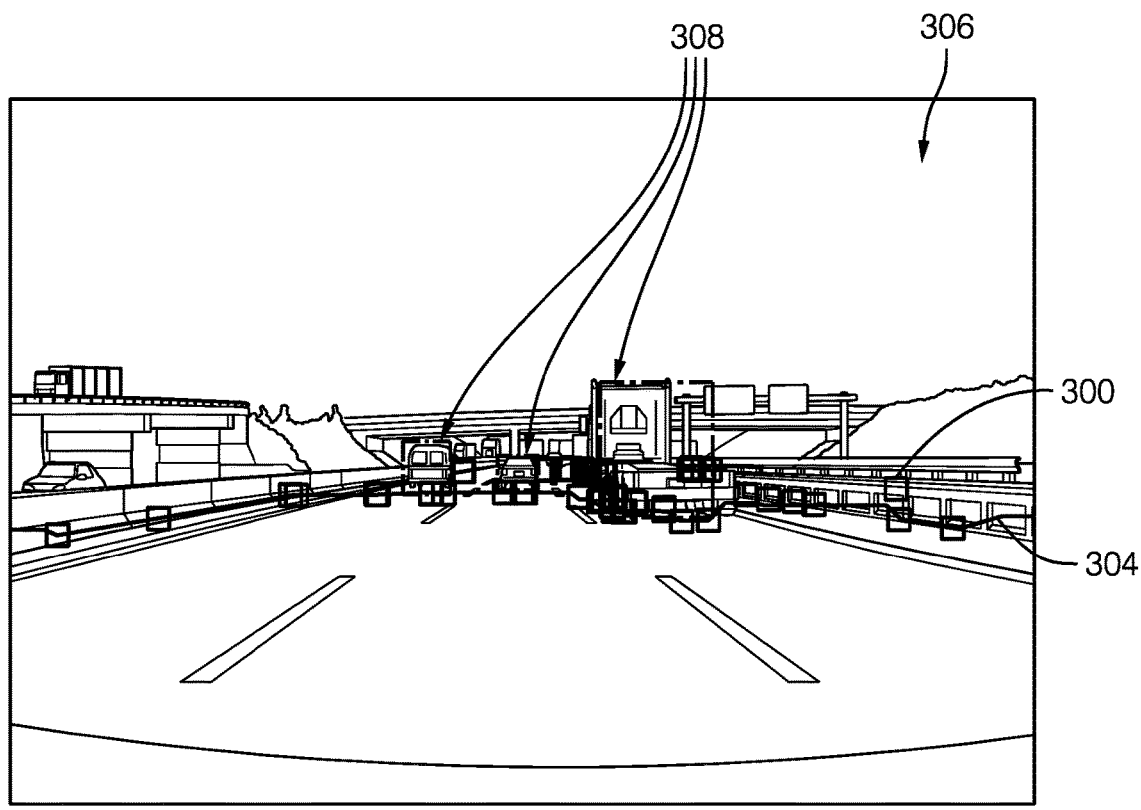
FIG. 3 depict an example of constructing a region of interest based on Radar detections by the system of FIG. 1.

To speed up the search for objects, in one embodiment, RDUs are used to construct a boundary curve that divides the image into free and occupied space. The resulting occupied space is the only region that needs to be searched by the vision algorithm and since it is usually smaller than the full image; it results in significant processing time saving to the sliding window algorithm. FIG. 3 presents an example of free space creation from RDUs 300 where RDUs overlaid on the image 302 are represented as white squares. The resulting free space boundary curve is shown in FIG. 3B (304) overlaid on the image 302.

Range-map (or depth map) is important for many ADAS and autonomous vehicle applications. In computer vision, structure from motion or stereo camera can be used to estimate a range-map. This typically does not provide sufficient density in the case of structure from motion or expensive using stereo camera in either hardware (two cameras) or software (disparity algorithms). In this disclosure, RDU range is used to build an approximate range-map. The range-map can be used to reduce the search space in the sliding window algorithm, to estimate Time to contact (TTC), to probably place or resize vision detection-zone, or to build an occupancy-grid among others.

In one embodiment, the range-map is constructed as shown in FIG. 5A. In the figure, RDU detections are shown as a black square and gray scale values represent distance from the bottom of the image. The range-map is constructed as follows. Let us use the range value at the lowest box 500 of the image as zero. Considering the RDU 502 in the lower left box of the image, the range value of the RDU is used as the ceiling of the range value from the lowest box 500 of the image and the range is gradually increased from zero to the ceiling in the lowest box 500. Now the top location of the lowest box 500 in the image is used as the range floor value. The second square 504, is defined from the ceiling of the lowest box 500 to the RDU range value of the RDU detection in the middle right of the image. This process is repeated until the last RDU is reached. No range values are assigned if no RDUs are available such as the top box 508.

In another embodiment, the range-map is defined as shown in FIG. 5B. In the figure, a range value is defined from RDU range value 512 and assigned to all pixels in the neighborhood of the detection such as pixels 514. The size of the neighborhood depends on whether there is a detected vision object in the neighborhood of the RDU detection or not, the type of radar, the distance from the camera among others. In the figure, the detection can be slightly rotated to match the radar contour behavior. The two methods can be combined as shown in FIG. 6 where the method in FIG. 5A is used for short range and the method in FIG. 5B is used for far range.

Figure 4A:
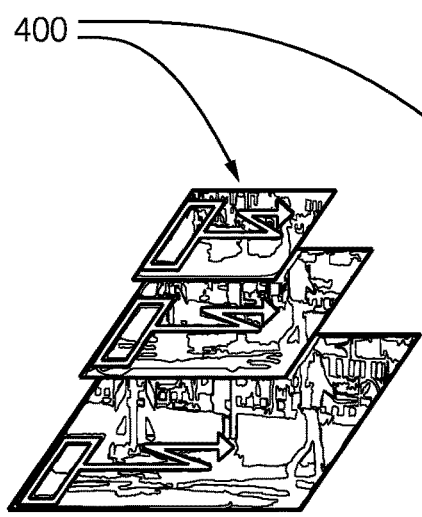
FIGS. 4A and 4B depict two examples of multi-scale object detection by the system of FIG. 1.
Figure 4B:
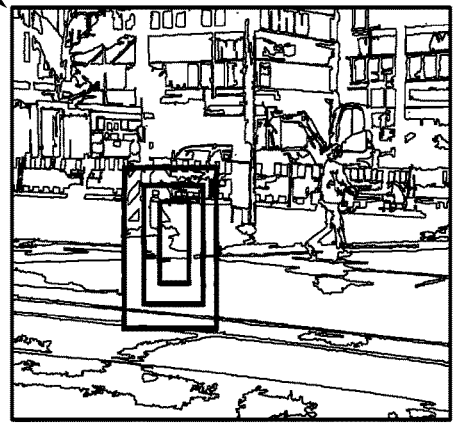

The range-map has a number of uses in vision algorithm. In one embodiment, the range-map is used to decide on the scale-factor 400 to use in the vision processing algorithm. As an example, only one or two scales are used in the sliding window algorithm. In another example, the range-map is used to calculate the detection-zone size as will be described below. This can result in significant saving in processing time. In FIG. 4, two examples of multi-scale processing are shown. In FIG. 4A, the detection-zone is fixed while the image size is reduced. Three images (scales) are shown in the figure. In FIG. 4B, an alternative implementation is shown with the detection-zone scaled while the image size is fixed.

In another embodiment, the range-map and range-rate are used for TTC calculation. TTC uses the free space in front of the vehicle to estimate the time to reach an object in front of the vehicle. TTC can be defined by; TTC=Range/Velocity, where range is estimated from the range-map and Velocity is defined as the relative speed of the host vehicle minus the speed of the target object. The target object speed can be computed from the RDU range-rate.

In one embodiment, the location and size of the detection-zone can be adjusted based on the range-map. For example, it is well known in the art [Robust range estimation with a monocular camera for vision based forward collision warning system, K. Park and S. Hwang, Scientific world journal January 2014], that if the real width of a vehicle is known, the vehicle width in the image can be defined using the formula: Vehicle width in image=Camera focal length*(Real Vehicle width/Z), where Z is the range in front of the camera. Using certain value for real vehicle width such as 1.4 m -2 m, the width of the image can be estimated. The projection of object into the image can be estimated as follows. A point in the road at Z will project to the image at a height y, where y is given by y=focal length*(camera height/Z). Since Z is known from the range-map, the height of the object y can be estimated. The analysis assumes that the camera is mounted so that the optical axis is parallel to the road surface. Similar analysis can be done if the camera is pitching down.

In an embodiment, RDU range-rate is used to improve tracking speed and accuracy. In vision tracking, an object detected at time "t" can be tracked at time "t+1" by searching the image at time "t+1" to find the best match to the image window at time "t". If no information on the object speed is available, the search area would be large and hence time consuming. If the search space is large, you may also end up matching the wrong image window in the second frame. Using RDU range-rate and possibly direction from RDU would help us better estimate how much an object moved and hence would help us focus the search in a smaller area of the image.

Figure 7:
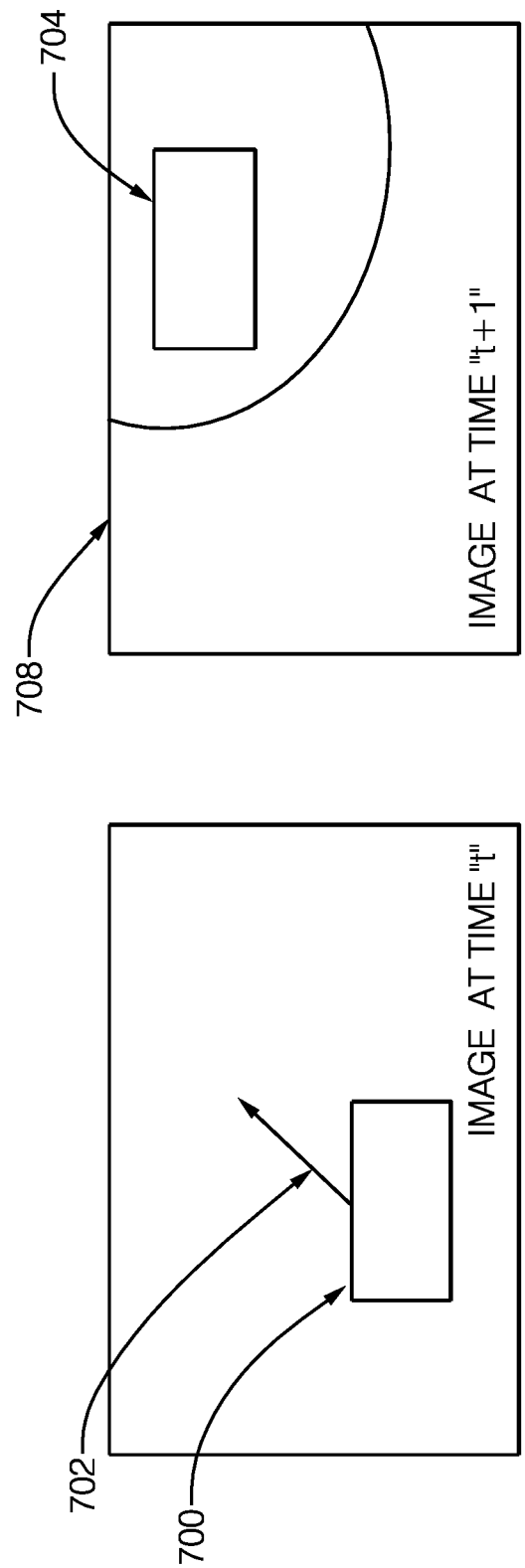
FIGS. 7A and 7B depict an illustration of tracking using RDU range-rate by the system of FIG. 1.

FIG. 7 illustrates the concept proposed in the above embodiment. In the figure, the detected object 700 at time "t" shown as a black box is tracked at time "t+1" 704. The direction 702 shown in the figure can be computed from RDU range-rate and direction and allow us to define a subsequent-zone 706 in the image at time "t+1". The search space or subsequent-zone 706 boundary is marked in black in the figure.

In yet another embodiment, the RDU range-rate can also be used to influence the classification results. As an example if an object window has an RDU with large RDU range-rate (fast object) it can be used to increase the confidence of a vehicle class vs. truck or motorcycle vs. bicycle.

As mentioned earlier, LiDAR can be used in similar way to compute free space and range-map. Since LiDAR provides more accurate and denser data, free space and range-map can be estimated with higher accuracy. The approach can be very useful for sparse LiDAR where only limited measurements are available during the LIDAR scan.

Occupancy-grid has been a popular environmental representation for a number of ADAS and automated driving applications. LiDAR has been the most widely used sensor for building occupancy-grids since it provides more accurate and denser measurements of occupancy. In this representation, the sensor field of view is tessellated into cells of certain size, for example, 20 cm×20 cm. Each cell is then classified into occupied, free, or unknown. The classification typically done using sensor measurements with a probability measure associated with the classification. The probability varies from 0-1 with low probability associated with low classification confidence and high probability associated with high confidence. In one embodiment, RDUs are used to define the occupancy of the grid by using the free space estimation described above. However due to the sparseness of radar detection, many cells may not be defined correctly. Vision algorithm can produce as estimated of the occupancy from color, texture, gradient or other visual measures. However, vision does not provide an accurate measurement of range. Therefore in one preferred embodiment, the occupancy-grid state (occupied, free, or unknown) is computed from combining radar and vision free space estimation. The range information needed for the occupancy-grid is computed from the range-map.

Figure 8:
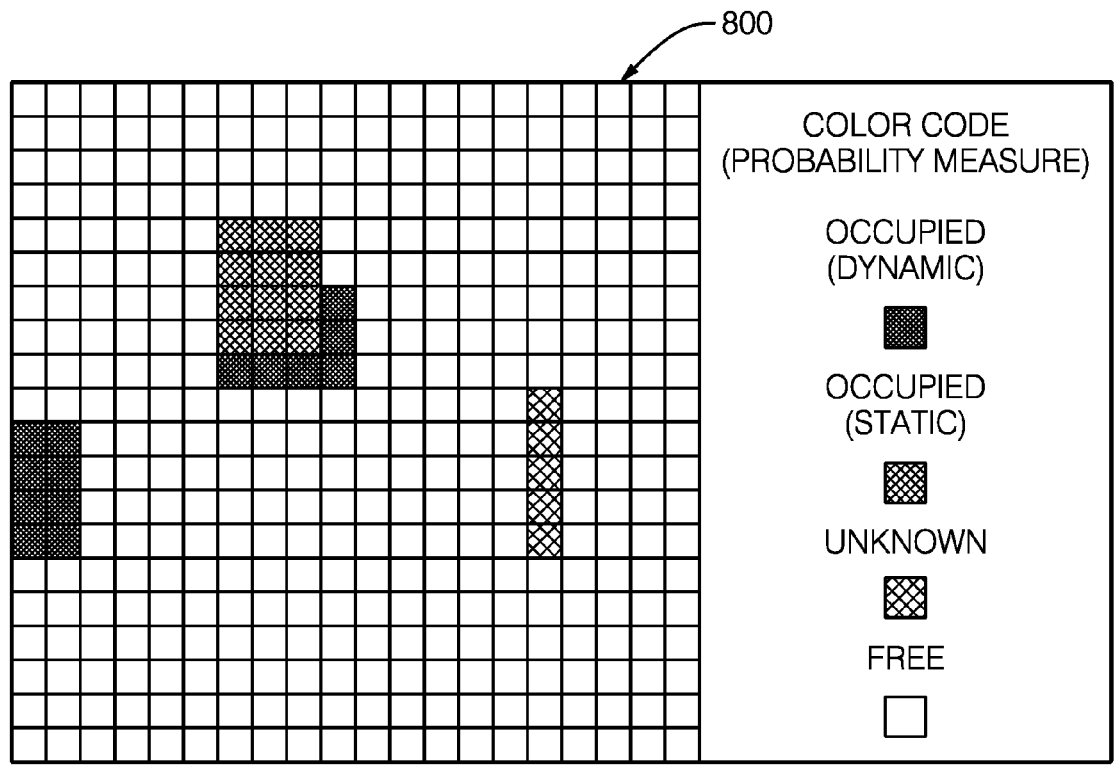
FIGS. 8A and 8B depicts examples of occupancy-grid and interval-map by the system of FIG. 1.
Figure 8:
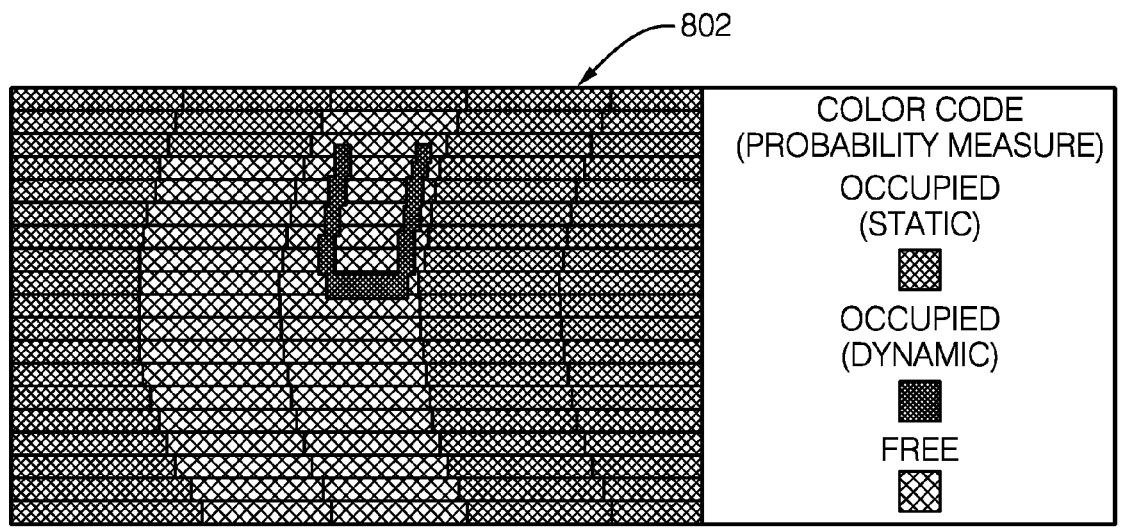

The occupancy-grid as described above provides a static representation of the environment. In one embodiment, dynamic information is added to the occupancy-grid from the RDU range-rate. The velocity information can be very important for many applications. The use of RDU range-rate provides more accurate dynamic information compared to estimating motion from vision directly. However, radar does not provide dense estimation and hence many cells in the occupancy-grid will have undefined dynamic state information. FIG. 8A shows an example of a dynamic instance of the occupancy-grid 800.

The interval-map 802 is another general environmental representation. In this presentation, the space around the vehicle is discretized in the longitudinal direction. In another embodiment, an interval-map is constructed similar to the occupancy-grid. In FIG. 8B, an example of a dynamic instance of an interval-map 802 is shown.

While this invention has been described in terms of the preferred embodiments thereof, it is not intended to be so limited, but rather only to the extent set forth in the claims that follow.

We claim:

1. An object-detection system, said system comprising:
a radar-sensor used to detect a radar-signal reflected by an object in a radar-field-of-view, said radar-signal indicative of a range and a direction to the object relative to the radar-sensor;
a camera used to capture an image of a camera-field-of-view that overlaps the radar-field-of-view; and
a controller in communication with the radar-sensor and the camera, said controller configured to determine a range-map for the image based on the range and the direction, define a detection-zone in the image based on the range-map, and process only the detection-zone of the image to determine an identity of the object, wherein the radar-signal is also indicative of an RDU range-rate of the object, and the controller is further configured to determine a TTC based on the RDU range and the RDU range-rate.

2. The system in accordance with claim 1, wherein the controller is further configured to adjust a size and a location of the detection-zone based on the range-map.

3. The system in accordance with claim 1, wherein the controller is further configured to determine a scale-factor based on the range-map, said scale-factor used to determine the identity of the object.

4. The system in accordance with claim 1, wherein the radar-signal is also indicative of a RDU range-rate of the object, and the controller is further configured to determine the identity of the object as one of a nearby-object and an occluded-object based on the RDU range and the RDU range-rate.

5. The system in accordance with claim 1, wherein the radar-signal is also indicative of a RDU range-rate and a direction of the object, and the controller is further configured to determine a subsequent-zone in a subsequent-image based on the detection-zone, the RDU range-rate, and the direction.

6. The system in accordance with claim 1, wherein the controller is further configured to determine an occupancy-grid of the image based on the range-map.

7. The system in accordance with claim 1, wherein the radar-signal is also indicative of a RDU range-rate of the object, and the controller is further configured to determine an occupancy-grid of the image based on the range-map and the RDU range-rate.

8. The system in accordance with claim 1, wherein the controller is further configured to determine an interval-map of the image based on the range-map.

9. The system in accordance with claim 1, wherein the radar-signal is also indicative of a range-rate of the object, and the controller is further configured to determine an interval-map of the image based on the range-map and the RDU range-rate.

10. An object-detection system, said system comprising:
a radar-sensor used to detect a radar-signal reflected by an object in a radar-field-of-view, said radar-signal indicative of a range and a direction to the object relative to the radar-sensor;
a camera used to capture an image of a camera-field-of-view that overlaps the radar-field-of-view; and
a controller in communication with the radar-sensor and the camera, said controller configured to determine a range-map for the image based on the range and the direction, define a detection-zone in the image based on the range-map, and process only the detection-zone of the image to determine an identity of the object, wherein the radar-signal is also indicative of a RDU range-rate of the object, and the controller is further configured to determine the identity of the object as one of a nearby-object and an occluded-object based on the RDU range and the RDU range-rate.

11. The system in accordance with claim 10, wherein the controller is further configured to adjust a size and a location of the detection-zone based on the range-map.

12. The system in accordance with claim 10, wherein the controller is further configured to determine a scale-factor based on the range-map, said scale-factor used to determine the identity of the object.

13. The system in accordance with claim 10, wherein the radar-signal is also indicative of an RDU range-rate of the object, and the controller is further configured to determine a TTC based on the RDU range and the RDU range-rate.

14. The system in accordance with claim 10, wherein the radar-signal is also indicative of a RDU range-rate and a direction of the object, and the controller is further configured to determine a subsequent-zone in a subsequent-image based on the detection-zone, the RDU range-rate, and the direction.

15. The system in accordance with claim 10, wherein the controller is further configured to determine an occupancy-grid of the image based on the range-map.

16. The system in accordance with claim 10, wherein the radar-signal is also indicative of a RDU range-rate of the object, and the controller is further configured to determine an occupancy-grid of the image based on the range-map and the RDU range-rate.

17. The system in accordance with claim 10, wherein the controller is further configured to determine an interval-map of the image based on the range-map.

18. The system in accordance with claim 10, wherein the radar-signal is also indicative of a range-rate of the object, and the controller is further configured to determine an interval-map of the image based on the range-map and the RDU range-rate.

* * * * *